US009397901B2

(12) United States Patent
Majumdar et al.

(10) Patent No.: US 9,397,901 B2
(45) Date of Patent: Jul. 19, 2016

(54) METHODS, SYSTEMS, AND COMPUTER READABLE MEDIA FOR CLASSIFYING APPLICATION TRAFFIC RECEIVED AT A NETWORK TRAFFIC EMULATION DEVICE THAT EMULATES MULTIPLE APPLICATION SERVERS (71) Applicant: Ixia, Calabasas, CA (US)

(72) Inventors: Partha Majumdar, Woodland Hills, CA (US); Rohan Chitradurga, Simi Valley, CA (US); Konstantin Belov, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 337 days.

(21) Appl. No.: 13/718,813

(22) Filed: Dec. 18, 2012

(65) Prior Publication Data

US 2014/0173094 A1    Jun. 19, 2014

(51) Int. Cl.
*G06F 15/16* (2006.01)
*H04L 12/26* (2006.01)
(Continued)

(52) U.S. Cl.
CPC ............. *H04L 43/028* (2013.01); *H04L 43/50* (2013.01); *H04L 47/10* (2013.01); *H04L 47/15* (2013.01); *H04L 63/20* (2013.01)

(58) Field of Classification Search
CPC ... H04L 63/14; H04L 63/1416; H04L 63/166; H04L 43/026; H04L 43/028; H04L 47/10; H04L 47/15; G06F 12/10
USPC .......................................... 709/231
See application file for complete search history.

(56) References Cited

U.S. PATENT DOCUMENTS 5,247,517 A    9/1993  Ross et al.
5,327,437 A    7/1994  Balzer
5,343,463 A    8/1994  van Tetering et al.
(Continued)

FOREIGN PATENT DOCUMENTS

EP    0 895 375 B1    8/2004

OTHER PUBLICATIONS

Non-Final Office Action for U.S. Appl. No. 13/716,077 (Sep. 24, 2014).
(Continued)

*Primary Examiner* — Kristie Shingles
(74) *Attorney, Agent, or Firm* — Jenkins, Wilson, Taylor & Hunt, P.A.

(57) ABSTRACT

Methods, systems, and computer readable media for classifying application traffic at a network traffic emulation device that emulates multiple application servers are disclosed. The method may include, at a network traffic emulation device, providing a plurality of different application flows for monitoring mixed application traffic received from different client applications via a device under test on the same transport layer port. For each of the different application flows that monitor the same transport layer port, parsing a payload of received packets associated with the same session in the mixed application traffic and identifying non-matching application flows based on whether a portion of each payload matches a signature associated with the application flow. The method further includes eliminating, as identification candidates, non-matching application flows from the application flows that monitor packets received on the same transport layer port until an application flow that identifies an application for the received packets associated with the same session remains.

31 Claims, 5 Drawing Sheets (51) Int. Cl.
*H04L 12/801* (2013.01)
*H04L 29/06* (2006.01)

(56) References Cited

U.S. PATENT DOCUMENTS

| | | | |
|---|---|---|---|
| 5,477,531 A | 12/1995 | McKee | |
| 5,535,338 A | 7/1996 | Krause et al. | |
| 5,568,471 A | 10/1996 | Hershey et al. | |
| 5,590,285 A | 12/1996 | Krause et al. | |
| 5,600,632 A | 2/1997 | Schulman | |
| 5,657,438 A | 8/1997 | Wygodny | |
| 5,671,351 A | 9/1997 | Wild | |
| 5,761,486 A | 6/1998 | Watanabe | |
| 5,787,253 A | 7/1998 | McCreery et al. | |
| 5,838,919 A | 11/1998 | Schwaller et al. | |
| 5,850,386 A | 12/1998 | Anderson et al. | |
| 5,878,032 A | 3/1999 | Mirek et al. | |
| 5,881,237 A | 3/1999 | Schwaller et al. | |
| 5,905,713 A | 5/1999 | Anderson et al. | |
| 5,937,165 A | 8/1999 | Schwaller et al. | |
| 5,974,237 A | 10/1999 | Shurmer et al. | |
| 6,028,847 A | 2/2000 | Beanland | |
| 6,044,091 A | 3/2000 | Kim | |
| 6,061,725 A | 5/2000 | Schwaller et al. | |
| 6,065,137 A | 5/2000 | Dunsmore et al. | |
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,321,264 B1 | 11/2001 | Fletcher | |
| 6,345,302 B1 | 2/2002 | Bennett et al. | |
| 6,360,332 B1 | 3/2002 | Weinberg | |
| 6,363,056 B1 | 3/2002 | Beigi et al. | |
| 6,397,359 B1 | 5/2002 | Chandra et al. | |
| 6,401,117 B1 | 6/2002 | Narad | |
| 6,408,335 B1 | 6/2002 | Schwaller et al. | |
| 6,421,730 B1 | 7/2002 | Narad | |
| 6,434,513 B1 | 8/2002 | Sherman et al. | |
| 6,446,121 B1 | 9/2002 | Shah | |
| 6,507,923 B1 | 1/2003 | Wall et al. | |
| 6,545,979 B1 | 4/2003 | Poulin | |
| 6,601,098 B1 | 7/2003 | Case | |
| 6,621,805 B1 | 9/2003 | Kondylis et al. | |
| 6,625,648 B1 | 9/2003 | Schwaller et al. | |
| 6,625,689 B2 | 9/2003 | Narad | |
| 6,662,227 B2 | 12/2003 | Boyd et al. | |
| 6,708,224 B1 | 3/2004 | Tsun et al. | |
| 6,763,380 B1 | 7/2004 | Mayton et al. | |
| 6,789,100 B2 | 9/2004 | Nemirovsky | |
| 6,920,407 B2 | 7/2005 | Adamian et al. | |
| 6,950,405 B2 | 9/2005 | Van Gerrevink | |
| 6,996,772 B2 | 2/2006 | Justice et al. | |
| 7,006,963 B1 | 2/2006 | Maurer | |
| 7,010,782 B2 | 3/2006 | Narayan et al. | |
| 7,516,216 B2 | 4/2009 | Ginsberg et al. | |
| 7,543,054 B1 | 6/2009 | Bansod et al. | |
| 7,765,313 B2 | 7/2010 | Jain et al. | |
| 8,010,469 B2* | 8/2011 | Kapoor et al. | 706/20 |
| 8,023,410 B2* | 9/2011 | O'Neill | H04L 12/185 370/235 |
| 8,135,657 B2* | 3/2012 | Kapoor et al. | 706/45 |
| 8,145,949 B2 | 3/2012 | Silver | |
| 8,341,462 B2 | 12/2012 | Broda et al. | |
| 8,402,313 B1 | 3/2013 | Pleis et al. | |
| 8,510,600 B2 | 8/2013 | Broda et al. | |
| 8,522,089 B2 | 8/2013 | Jindal | |
| 8,601,585 B2 | 12/2013 | Beddoe et al. | |
| 8,676,188 B2 | 3/2014 | Olgaard | |
| 8,839,035 B1 | 9/2014 | Dimitrovich et al. | |
| 9,065,556 B2 | 6/2015 | Popescu et al. | |
| 9,075,735 B2* | 7/2015 | Tomlinson | G06F 12/10 |
| 9,116,873 B2 | 8/2015 | Majumdar et al. | |
| 9,131,000 B2 | 9/2015 | Iyer | |
| 9,178,790 B2 | 11/2015 | Majumdar et al. | |
| 9,178,823 B2 | 11/2015 | Majumdar et al. | |
| 2002/0080781 A1 | 6/2002 | Gustavsson | |
| 2003/0009544 A1 | 1/2003 | Wach | |
| 2003/0012141 A1 | 1/2003 | Gerrevink | |
| 2003/0033406 A1 | 2/2003 | John et al. | |
| 2003/0043434 A1 | 3/2003 | Brachmann et al. | |
| 2003/0231741 A1 | 12/2003 | Rancu et al. | |
| 2005/0022012 A1 | 1/2005 | Bluestone et al. | |
| 2006/0242499 A1 | 10/2006 | Volz | |
| 2006/0268933 A1 | 11/2006 | Kellerer et al. | |
| 2008/0285467 A1 | 11/2008 | Olgaard | |
| 2008/0298380 A1 | 12/2008 | Rittmeyer et al. | |
| 2009/0100296 A1 | 4/2009 | Srinivasan et al. | |
| 2009/0100297 A1 | 4/2009 | Srinivasan et al. | |
| 2010/0050040 A1 | 2/2010 | Samuels et al. | |
| 2011/0238855 A1* | 9/2011 | Korsunsky et al. | 709/231 |
| 2011/0283247 A1 | 11/2011 | Ho et al. | |
| 2012/0144226 A1 | 6/2012 | Yang et al. | |
| 2012/0192021 A1 | 7/2012 | Jindal | |
| 2012/0240185 A1* | 9/2012 | Kapoor et al. | 726/1 |
| 2012/0314576 A1 | 12/2012 | Hasegawa et al. | |
| 2013/0006567 A1 | 1/2013 | Horn | |
| 2013/0060735 A1 | 3/2013 | Haddy et al. | |
| 2013/0111257 A1 | 5/2013 | Broda et al. | |
| 2013/0208600 A1 | 8/2013 | Campbell et al. | |
| 2013/0227092 A1 | 8/2013 | Maestas | |
| 2013/0275606 A1 | 10/2013 | Iyer | |
| 2013/0286860 A1 | 10/2013 | Dorenbosch et al. | |
| 2013/0346719 A1* | 12/2013 | Tomlinson | G06F 12/10 711/165 |
| 2014/0036700 A1 | 2/2014 | Majumdar et al. | |
| 2014/0160927 A1 | 6/2014 | Majumdar et al. | |
| 2014/0169177 A1 | 6/2014 | Popescu et al. | |
| 2014/0289561 A1 | 9/2014 | Majumdar et al. | |

OTHER PUBLICATIONS

Non-Final Office Action for U.S. Appl. No. 13/447,160 (Jul. 10, 2014).
Advisory Action for U.S. Appl. No. 13/447,160 (May 29, 2014).
Applicant-Initiated Interview Summary for U.S. Appl. No. 13/447,160 (May 23, 2014).
Final Office Action for U.S. Appl. No. 13/447,160 (Mar. 18, 2014).
Interview Summary for U.S. Appl. No. 13/447,160 (Feb. 25, 2014).
Non-Final Office Action for U.S. Appl. No. 13/447,160 (Nov. 8, 2013).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
Abbes et al., "Protocol Analysis in Intrusion Detection Using Decision Tree," IEEE, Proceedings of the International Conference on Information Technology: Coding and Computing (ITCC'04), pp. 1-5 (2004).
Sleator et al., "Self-Adjusting Binary Search Trees," Journal of the Association for Computing Machinery. vol. 32, No. 3, pp. 652-686 (Jul. 1985).
Notice of Allowance and Fee(s) Due for U.S. Appl. No. 13/447,160 (Apr. 30, 2015).
Applicant-Initiated Interview Summary for U.S. Appl. No. 13/447,160 (Mar. 26, 2015).
Advisory Action for U.S. Appl. No. 13/447,160 (Mar. 5, 2015).
Notice of Allowance and Fee(s) Due for U.S. Appl. No. 13/716,077 (Feb. 20, 2015).
Nilsson et al., "The Scalable Tree Protocol—A Cache Coherence Approach for Large-Scale Multiprocessors," IEEE, pp. 498-506 (1992).
Notice of Allowance and Fee(s) Due for U.S. Appl. No. 13/712,499 (Jun. 22, 2015).
Notice of Allowance and Fee(s) Due for U.S. Appl. No. 13/567,747 (Jun. 22, 2015).

(56) References Cited

OTHER PUBLICATIONS

Notice of Allowance and Fee(s) Due for U.S. Appl. No. 13/871,909 (Apr. 20, 2015).
Notice of Allowance and Fee(s) Due for U.S. Appl. No. 13/712,499 (Mar. 11, 2015).
Notice of Allowance and Fee(s) Due for U.S. Appl. No. 13/567,747 (Mar. 5, 2015).
Non-Final Office Action for U.S. Appl. No. 13/871,909 (Nov. 20, 2014).
Non-Final Office Action for U.S. Appl. No. 13/567,747 (Nov. 19, 2014).
Non-Final Office Action for U.S. Appl. No. 13/712,499 (Jul. 14, 2014).
"Ixload Specifications," http://web.archive.org/web/20130127053319//www.ixiacom.com/products/network_test/applications/ixload/specifications/index.php. pp. 1-7, (Jan. 27, 2013).
"A TCP Tutorial," ssfnet.org/Exchange/tcp/tcpTutorialNotes.html, pp. 1-10 (Apr. 4, 2012).
"IxLoad," Solution Brief, 915-3030-01. D, Ixia, pp. 1-4 (Feb. 2012).
Notice of Allowance and Fee(s) Due for U.S. Appl. No. 11/462,351 (Feb. 6, 2009).
Restriction Requirement for U.S. Appl. No. 11/462,351 (Jan. 2, 2009).
Ye et al., "Large-Scale Network Parameter Configuration Using an On-line Simulation Framework," Technical report, ECSE Department, Rensselear Polytechnic Institute (2002).
Business Wire, "Ixia's Web Stressing and In-Service Monitoring Products Names Best of Show Finalist at NetWorld+Interop 2001, Atlanta," 2 pages (Sep. 10, 2001).
PRNewsWire, "Caw Network Doubles Performance of Real-World Capacity Assessment Appliance Suite: WebAvalanche and WebReflector Now Generate and Respond to 20,000+ HTTP requests per Second With Over One Million Open Connections," 2 pages (Sep. 10, 2001).
Caw Networks, Inc. and Foundry Networks, Inc., "Caw Networks Performance Brief: Caw Networks and Foundry Networks 140,000 Transactions per Second Assessment," 1 page (Sep. 7, 2001).
MacVittie, "Online Only: CAW's WebReflector Makes Load-Testing a Cakewalk," Network Computing, 2 pages (Sep. 3, 2001).
Business Wire, "REMINDER/Caw Networks to Spotlight WebAvalanche 2.0 and WebReflector At Networld+Interop," 2 pages (May 8, 2001).
"Caw Networks Unveils New Web-Stressing Appliance," press release from Caw Networks, Inc., 2 pages (Mar. 5, 2001).
Ye et al., "Network Management and Control Using collaborative On-Line Simulation," Proc. IEEE International Conference on Communications ICC2001, Helsinki, Finland, pp. 1-8 (2001).
Business Wire, "NetIQ's Chariot 4.0 Goes Internet-Scale; ASPs and Service Providers Can Conduct Tests With Up to 10,000 Connections; New Visual Test Designer Simplifies Testing of All Sizes," 1 page (Oct. 23, 2000).
Business Wire, "Spirient Communications TeraMetrics and NetIQ's Chariot Work Together to Create First Complete Network Performance Analysis Solution," 2 pages (Sep. 25, 2000).
Kovac, "Validate your equipment performance—Netcom Systems' SmartBits—Hardware Review—Evaluation," Communications News, 2 pages (May 2000).
Marchette, "A Statistical Method for Profiling Network Traffic," USENIX (Apr. 12-19, 1999).
Cooper et al., "Session traces: an enhancement to network simulator," Performance, computing and Communications Conference, Scottsdale, AZ (Feb. 1, 1999).
San-qi, et al., "SMAQ: A Measurement-Based Tool for Traffic Modeling and Queuing Analysis Part I; Design methodologies and software architecture," IEEE Communications Magazine, pp. 56-65 (Aug. 1, 1998).
San-qi, et al., "SMAQ: A Measurement-Based Tool for Traffic Modeling and Queuing Analysis Part II; Network Applications," IEEE Communications Magazine, pp. 66-77 (Aug. 1, 1998).
Mneimneh, "Computer Networks Flow control with TCP," pp. 1-5 (Publication Date Unknown).
Final Office Action for U.S. Appl. No. 13/447,160 (Dec. 19, 2014).
Dutta et al., "A Tight Lower Bound for Parity in Noisy Communcations Networks," Tata Institute of Fundamental Research, pp. 1056-1065 (2008).

* cited by examiner

METHODS, SYSTEMS, AND COMPUTER READABLE MEDIA FOR CLASSIFYING APPLICATION TRAFFIC RECEIVED AT A NETWORK TRAFFIC EMULATION DEVICE THAT EMULATES MULTIPLE APPLICATION SERVERS

TECHNICAL FIELD

The subject matter described herein related to generating simulated network traffic. More particularly, the subject matter described herein related to methods, systems, and computer readable media for classifying application traffic received at a network traffic emulation device that emulates multiple application servers.

BACKGROUND

Some network components, such as firewalls, network address translators (NATs), intrusion detection systems (IDSs), intrusion protection systems (IPSs), deep packet inspection (DPI) devices, wide area network (WAN) optimization devices, layer 7 traffic accelerators, and server load balancers (SLBs), process a diverse mix of network traffic in operation. Accordingly, before deploying such equipment in a live network, it is desirable to test the equipment with a traffic simulation that is representative of the traffic mix that the equipment will handle upon deployment. For example, it may be desirable to test a firewall by repeatedly sending traffic from different applications through the firewall.

In today's world with the advancement of Internet and smart phones, we are seeing an explosion of Internet based applications. These applications run on multiple machines where many of them are servers and mainly serving requests sent by associated application clients. Notably, all of these applications are not defining their own transport, but instead use a common layer 4 to layer 7 transport to exchange application specific messages. One such common transport is HTTP, which is associated TCP listen port 80. Similarly, many secured applications may exchange messages using HTTPS via the listening port 443. Examples of applications running HTTP or HTTPS are Facebook, Google Maps, Twitter, and the like. Even though all of these applications/protocols are running on top of HTTP, each of the messages exchanged adhere to completely different formats known only to the application client and server. Namely, a common server cannot service the requests sent by a different application client since messages sent by different clients cannot be parsed using a common set of rules.

Normally, the servers for different applications run on different hosts having different IP addresses even though they share the same transport layer port (TCP port). Specifically, the IP address and port combination uniquely points to a single application server which exactly knows how to parse messages associated with a particular application. In a network traffic emulation environment, things become further complicated since there is a need to emulate multiple application servers on a single host. One possible solution to this problem is to implement complete application servers (e.g., a Google server, a Facebook server, a YouTube server, etc.) on the same emulation device. Another possible solution would be to implement a single monolithic server hard coded to recognize and respond to messages from different applications. However, neither possible solution is scalable.

Accordingly, there exists a long felt need for methods, systems, and computer readable media for classifying application traffic received at a network traffic emulation device emulating multiple application servers.

SUMMARY

Methods, systems, and computer readable media for classifying application traffic at a network traffic emulation device that emulates multiple application servers are disclosed. The method may include, at a network traffic emulation device, providing a plurality of different application flows for monitoring mixed application traffic received from different client applications via a device under test on the same transport layer port. For each of the different application flows that monitor the same transport layer port, parsing a payload of received packets associated with the same session in the mixed application traffic and identifying non-matching application flows based on whether a portion of each payload matches a signature associated with the application flow. The method further includes eliminating, as identification candidates, non-matching application flows from the application flows that monitor packets received on the same transport layer port until an application flow that identifies an application for the received packets associated with the same session remains.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, of which.

DETAILED DESCRIPTION

Figure 1:
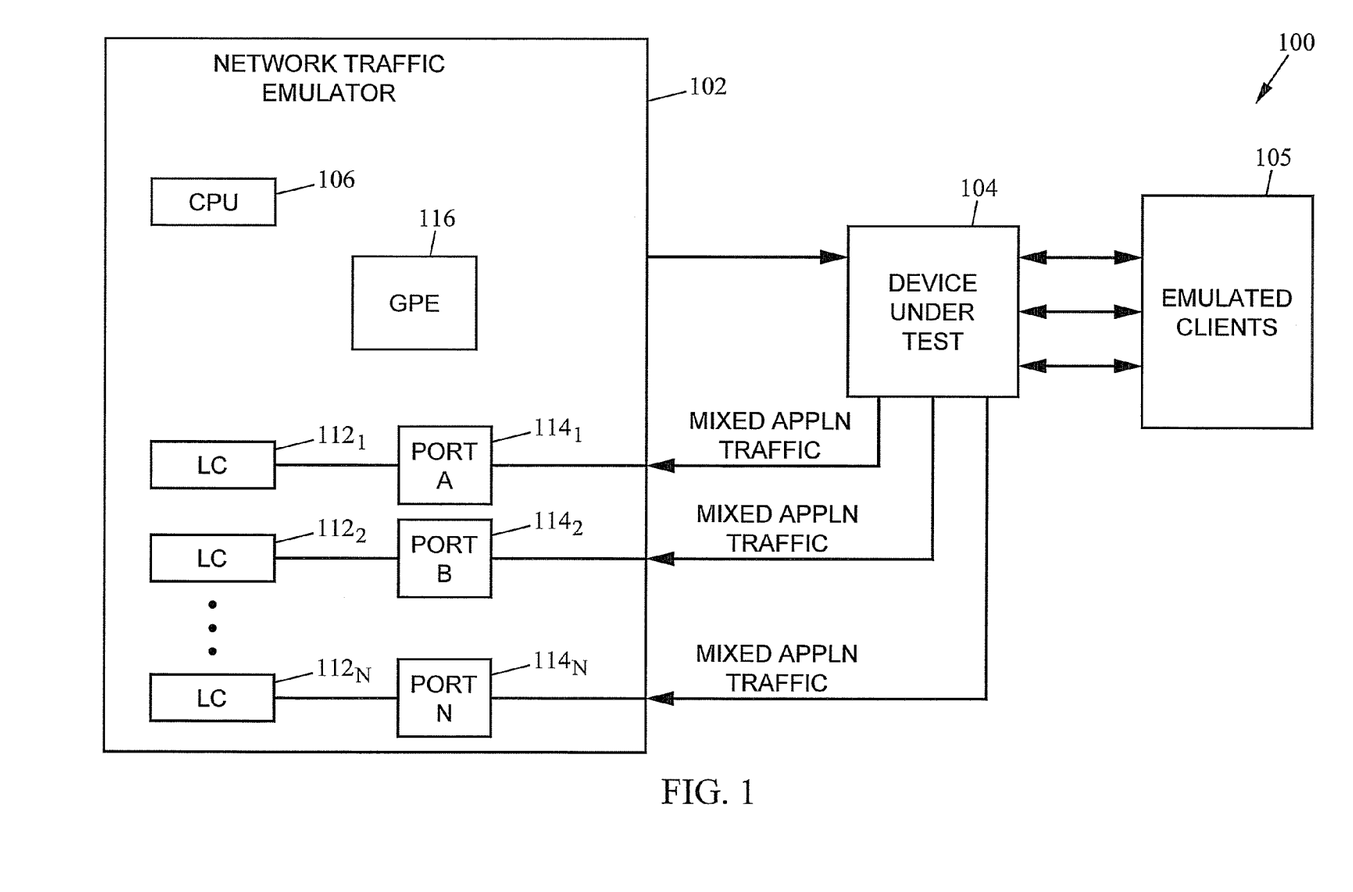
FIG. 1 is a block diagram of a system for classifying application traffic received at a network traffic emulation device that emulates multiple application servers according to an embodiment of the subject matter described herein.

FIG. 1 is a block diagram of a system for classifying application traffic received at a network traffic emulation device that emulates multiple application servers according to an embodiment of the subject matter described herein. Referring to FIG. 1, traffic simulation system 100 includes a network traffic emulator 102 that emulates multiple application servers and communicates simulated packet traffic with emulated clients 105 via a device under test (DUT) 104. For example, emulator 102 may emulate Internet application servers, such as search engine servers, social networking servers, video servers, etc. However, rather than implementing full versions of each of these servers, emulator 102 may implement flows for each server, where a flow is configured to identify packets associated with a particular application and respond to at least initial requests from clients in the same manner as the server being emulated. The operation of the flows will be described in more detail below.

Device under test 104 may be any suitable network device whose functionality is being tested. Examples of such a device include a network address translator (NAT), a firewall, an intrusion detection system (IDS), an intrusion protection system (IPS), a deep packet inspection (DPI) device, a wide area network (WAN) optimization device, a layer 7 accelerator, and a server load balancer (SLB), and the like. Emulator 102 includes a central processing unit (CPU) 106 that executes a multi-flow application (MFA) module 108 and a general parsing engine (GPE) 116. Emulator 102 further includes a plurality of listening ports, i.e., transport layer ports $114_{1...N}$ that are configured for receiving mixed application traffic generated by emulated clients and sent to emulator 102 via DUT 104. Transport layer ports $114_{1...N}$ may be configured to handle UDP, TCP, or any other transport layer protocol. In one embodiment, the received application traffic may include packets associated with an application request message. Each listening port 114 is associated with a respective listening context 112. Although not shown in FIG. 1, each listening context 112 may contain a plurality of application flows. As used herein, an application flow is a set of instructions executed by the emulator to listen for traffic from a particular application and, upon identifying traffic from a particular application, for implementing a portion of the application protocol. Each application flow may use a stored data pattern or sequence (e.g., a signature) that can be compared to payload data contained by the received application traffic. Each application flow may also access a stored sequence of message and data exchanges that is characterized by a predefined format associated with a predefined (e.g., well-known) application or protocol. Additional description pertaining to listening contexts $114_{1...N}$ and associated application flows is provided below with respect to FIG. 2.

Emulator 102 may implement a flow pruning algorithm, a flow parse algorithm, and a flow established algorithm to quickly and efficiently identify the application flow to which a session belongs. As used herein, the flow-parse algorithm includes a method, callback, or subroutine that may be utilized by an application flow to recognize a format of application message traffic generated by an associated application or protocol. Similarly, the flow-established algorithm includes a method, callback, or subroutine that may be utilized once for each new session or connection with an application flow that has been identified as a potential candidate for owning an application traffic session. Moreover, the flow-pruning algorithm may include a primary software program that utilizes the flow-parse algorithm and flow-established algorithm to promptly identify applications associated with various application traffic received at a transport layer port.

Figure 2:
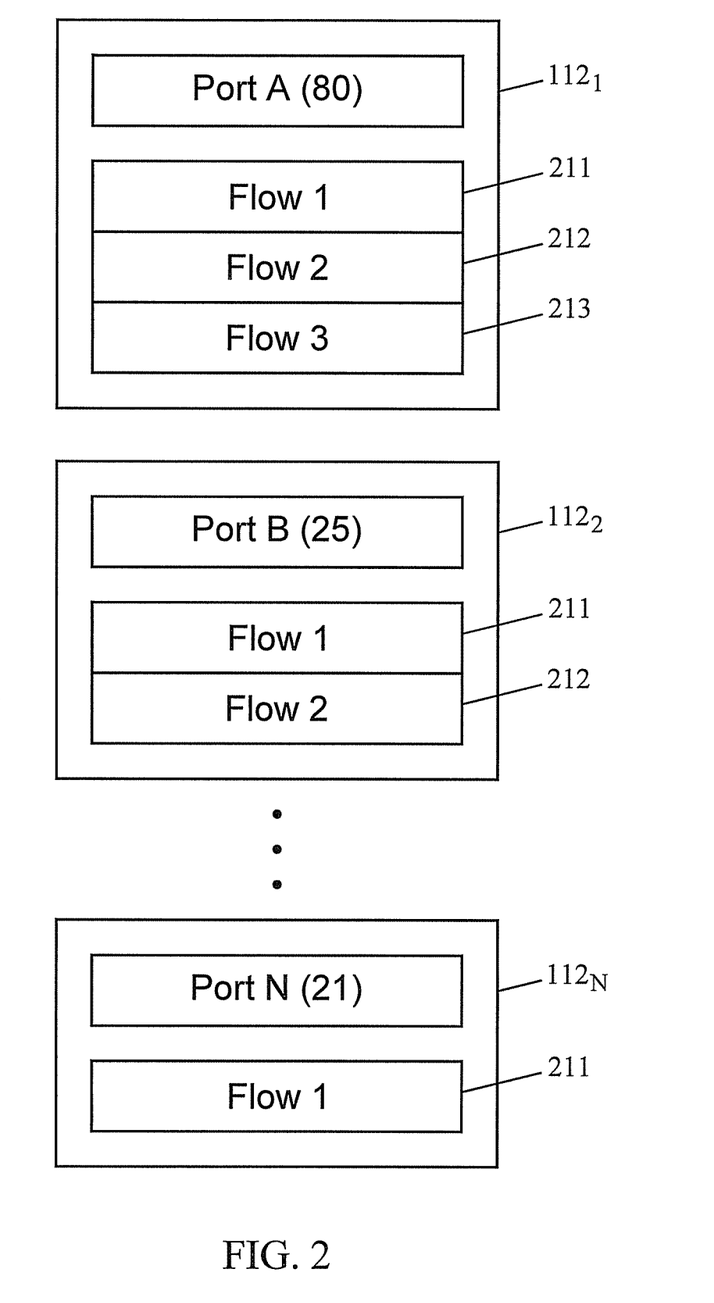
FIG. 2 is a block diagram illustrating exemplary listening contexts containing application flows according to an embodiment of the subject matter described herein.

FIG. 2 is a block diagram chart illustrating exemplary listening contexts containing application flows according to an embodiment of the subject matter described herein. More specifically, FIG. 2 illustrates a logical representation of the listening contexts 112 depicted in FIG. 1. As indicated above, a listening context may be created and associated with a particular transport layer port, i.e., a listening port. Although FIG. 2 only depicts three different listening contexts and three different application flows, additional listening contexts and application flows may be utilized without departing from the scope of the present subject matter. Each listening context may be logically viewed as a bucket that contains one or more application flows. Prior to conducting a network traffic simulation, a plurality of application flow is distributed among the listening contexts. For example, a network operator may provision the plurality of listening contexts in emulator 102 with application flows based on the type of protocol or application traffic the network operator desires the corresponding transport layer ports to detect. In one embodiment, the provisioning or distribution of application flows may occur during the configuration of the traffic test or emulation. The application flow distribution can be a one-time operation in the duration of the test or emulation. An application flow may be assigned with an identifier (ID) or link that is unique within the listening context boundary.

Referring to FIG. 2, each of listening contexts $112_{1...N}$ may include one or more application flow instances. For example, each of listening contexts $112_{1...N}$ associated with transport layer ports 80, 25, and 21 includes application flow 211 (i.e., "Flow 1"). However, listening contexts $112_1$ and $112_2$ each include an instance of application flow 212 (i.e., "Flow 2"). Lastly, only listening context $112_1$ includes application flow 213 (i.e., "Flow 3"). Specifically, listening context $112_1$ includes instances of three different application flows 211-213. Thus, in the event application traffic (e.g., a request message) is received on listening port number 80 in emulator 102, the payload data of the request message packet is parsed and compared to the unique signatures/patterns associated with each of application flows 211-213.

Figure 3:
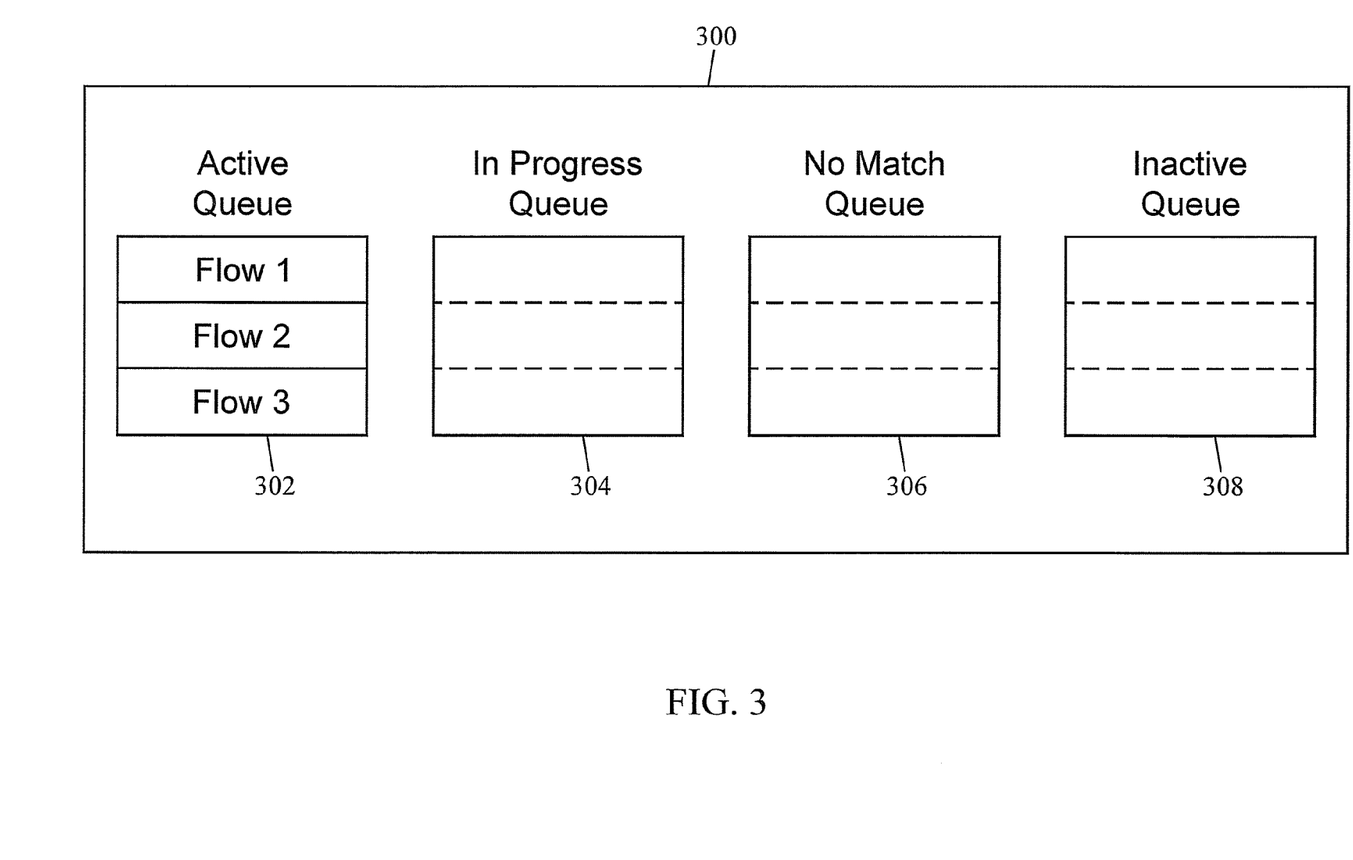
FIG. 3 is a block diagram illustrating an exemplary session object used to classify received application traffic according to an embodiment of the subject matter described herein.

FIG. 3 is a block diagram illustrating an exemplary session object exemplary session object used to classify received application traffic according to an embodiment of the subject matter described herein. Upon receiving a new session (or connection) at a particular transport layer port, the listening context associated with the transport layer port is looked up. Once a listening context is activated, a session object for the new session received on the transport layer port may be allocated by the software running the flow pruning algorithm. In one embodiment, the generated session object may be allocated with sufficient space for storing an IO/Parse context for each of the applications flows associated with a listening context. In one embodiment, the IO/Parse context includes a structure or object configured to contain state information related to the parsing state. For example, different application flows may attempt to locate different patterns which may not be received in one packet or data chunk/portion. Thus, the application flow may need to update state variables contained in the IO/Parse context so the application flow may manage the amount/type of data found in earlier received packets or data chunk/portions.

As shown in FIG. 3, a session object 300 may include four queues for storing links (or identifiers) corresponding to application flows. In one embodiment, session object 300 includes an active queue 302, an in progress queue 304, a no match queue 306, and an inactive queue 308. In FIG. 3, active queue 302 includes three application flow links represented by "Flow 1, Flow 2, and "Flow 3" that are respectively associated with three application flows contained in a listening context (e.g., listening context $112_1$ illustrated in FIG. 2).

The utilization of queues 302-308 of session object 300 may be described in the context of the aforementioned flow-pruning algorithm, flow-parse algorithm, and flow-established algorithm. For example, after a session object is allocated and initialized (e.g., generated), a flow-established algorithm is called for each application flow link included in Active queue 302. In one embodiment, the flow-established algorithm is executed for each application flow and performs a number of steps based on different conditions. For example, the flow-established algorithm may initiate by setting the Receive status in that application flow to a NO_MATCH_FOUND value. In the event application data (e.g., a response message) is to be sent to an emulated client, a determination is made as to whether the silent-flag is set or not. As used herein, a silent-flag includes a read-and-modify flag that is passed to both the flow-parser and flow-established algorithms. If the flow-established algorithm decides to send application data to an initiator/client, it should first read the silent flag. If a silent flag is not set, then the flow-established algorithm sends the message/data to the client and the silent-flag is set. Notably, other application flows may receive the updated silent-flag. If a silent-flag is set, then the flow-established algorithm does not send the message/data. If the flow-established algorithm needs to open another secondary (linked) connection (e.g., an additional data channel depending on the definition of the flow), then the flow-established algorithm may initiate the secondary connection and change the receive status to an EXCLUSIVE_MATCH value. If the flow-established algorithm needs to listen for another secondary (linked) connection, then the flow-established algorithm starts listening for the secondary connection and changes the Receive status to an EXCLUSIVE_MATCH value. If the flow-established algorithm needs to close/terminate the connection or session, the flow-established algorithm schedules a close/termination event and changes the Receive status to a MATCH_DONE value. Lastly, the flow-established algorithm returns the Receive status along with the silent flag.

Similarly, a flow state machine associated with the present subject matter may utilize a flow parse algorithm if called by the flow pruning algorithm (discussed in detail below). For example, if any data is received from the remote end (e.g., an emulated client or initiator) for a session which includes more than one application flow in Active queue 302, then the flow-parse algorithm is called for each application flow in Active queue 302. In one embodiment, the flow-parse algorithm of each application flow may perform a number of tasks. For example, the flow-parse algorithm determines whether a portion of the payload data matches a predefined signature (e.g., a predefined data sequence or pattern) associated with the application flow.

In the event a portion of the received data (e.g., payload data) matches a signature associated with the application flow, then the flow-parse algorithm may set the Receive status to a "MATCH_IN_PROGRESS" value. Otherwise, the Receive status is set to NO_MATCH_FOUND.

In the event application data (e.g., a response message) is to be sent to an emulated client, a determination is made as to whether the silent-flag is set or not. If a silent flag is not set, then the flow-established algorithm sends the message/data to the client and the silent-flag is set. Notably, flow-parser for other application flows may receive the updated silent-flag. If a silent-flag is set, then the flow-parse algorithm does not send the message/data. If the flow-parse algorithm needs to open another secondary (linked) connection (e.g., an additional data channel depending on the definition of the application flow), then the flow-parse algorithm may initiate the secondary connection and change the Receive status to an EXCLUSIVE_MATCH value. If the flow-parse algorithm needs to listen for another secondary (linked) connection, then the flow-parse algorithm starts listening for the secondary connection and changes the Receive status to an EXCLUSIVE_MATCH value. If the flow-parse algorithm needs to close/terminate the connection or session, the flow-parse algorithm schedules a close/termination event and changes the Receive status to a MATCH_DONE value. Lastly, the flow-parse algorithm returns the Receive status along with the silent flag.

In one embodiment, the caller of the flow-established and/or flow-parse algorithms executes the steps provided by the flow-pruning algorithm based on the return values of the flow-established and/or flow-parse algorithms (e.g., for each of the application flows). For example, if the flow-parse algorithm produces an EXCLUSIVE_MATCH return value for a particular application flow, then a link of that application flow remains in Active queue 302 while links associated with all of the other application flows are moved to Inactive queue 308. The application flow corresponding to the sole remaining flow link (i.e., all other flow links have been eliminated or moved to another queue) in Active queue 302 assumes full ownership of the session at this time. Notably, this means an application flow should not attempt to close or start a new session/connection before any data that uniquely identifies the flow is received.

In the event a flow-parse algorithm provides a MATCH_IN_PROGRESS return value for at least one application flow, then a link associated with that application flow is transferred to In Progress queue 304. If the flow-parse algorithm produces a NO_MATCH_FOUND return value for an application flow, then a flow link associated with that application flow is transferred to No Match queue 306. At this time, any application flow residing in No Match queue 306 would be excluded from further consideration.

If the flow-parse algorithm returns a MATCH_DONE value, then all processing ceases and the flow-pruning algorithm is aborted at that point.

If at the end of the process a MATCH_DONE value is not returned by any flow-parse algorithm, then a determination is made as to whether In Progress queue 304 is not empty. If In Progress queue 304 is not empty, then all application flow links are moved from In Progress queue 304 to Active queue 302. Similarly, all application flow links are moved from No Match queue 306 (if any) to Inactive queue 308 if In Progress queue 304 is not empty. Conversely, if No Match queue 306 is not empty and in-progress queue 304 is empty, then all application flow links in no match queue 396 are transferred to Active queue 302.

If there is only one remaining application flow link in Active queue 302 at the end of the process, then the associated application assumes full ownership of the session. Once a single flow assumes the final ownership of the session, then the IO processing switches to a faster path that does not process the return codes of the flow-established algorithm or flow-parse algorithm since additional pruning is no longer needed.

Notably, the return values of the flow-established algorithm may be treated in the same manner (by the flow-pruning algorithm) as the return values of the flow-parse algorithm. However, it should be noted that the flow-established algorithm does not return a MATCH_IN_PROGRESS value.

Since application flow links are temporarily stored within In Progress queue 304 and No Match queue 306 and moved out to Active queue 302 and Inactive queue 308 in the same function context, the flow links may not be stored inside a session object. Alternatively, memory may be optimized to include the use of local memory for In Progress queue 304 and No Match queue 306, both of which will be released after the flow pruning algorithm returns.

For speed optimization, the memory for sessions may not actually be released when the session is closed. Instead, the session memory may be reused for a new session/connection that is ultimately accepted on the same transport layer listening port. In such a scenario, application flow links may be moved back to Active queue 302 from Inactive queue 308 during re-initialization. In one embodiment, to optimize the session allocations further, the size of the memory needed for a session can pre-computed and stored at a per listening port basis.

Figure 4A:
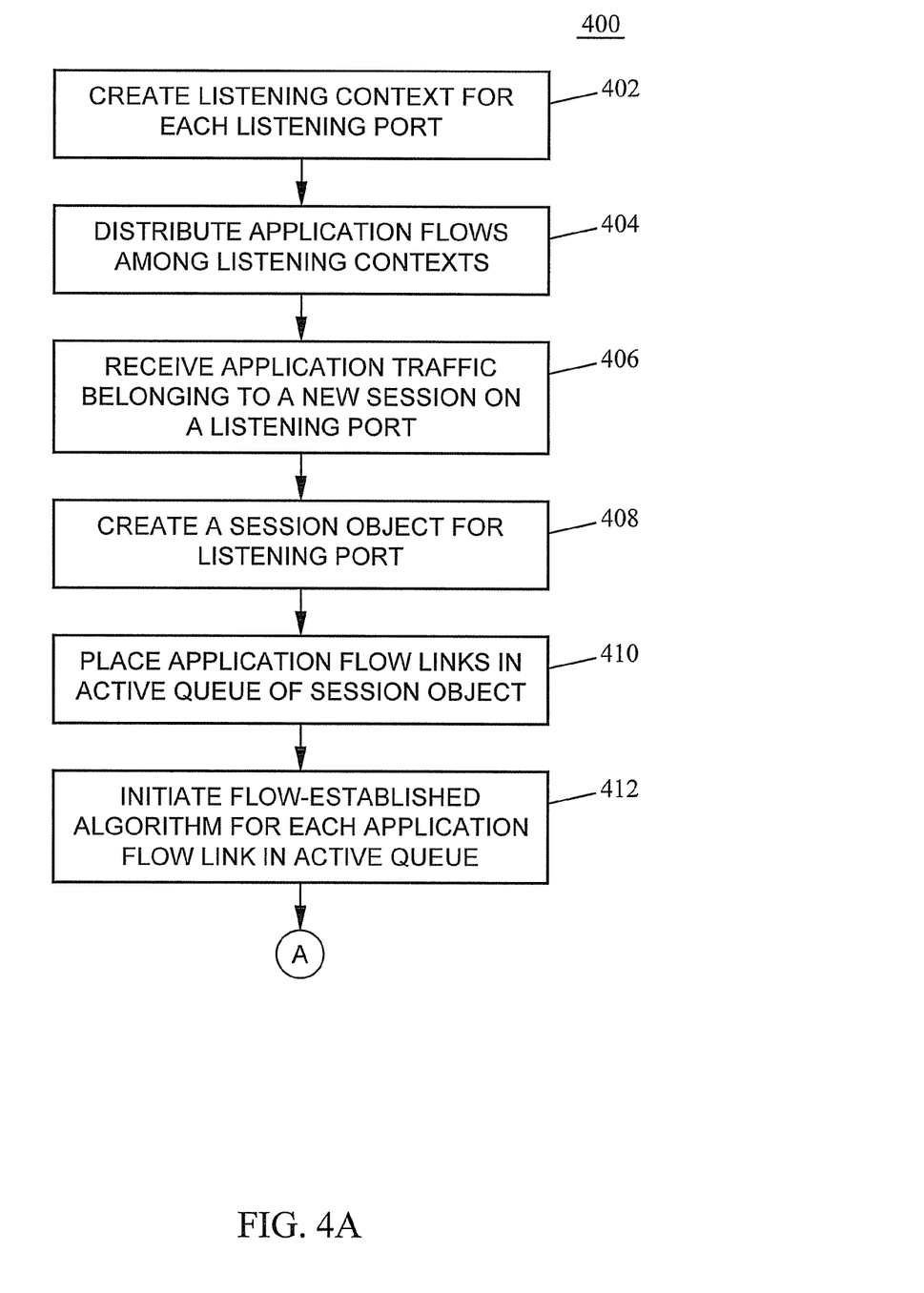
FIGS. 4A and 4B are a flow chart illustrating a method for classifying application traffic received at a network traffic emulation device that emulates multiple application servers according to an embodiment of the subject matter described herein.
Figure 4B:
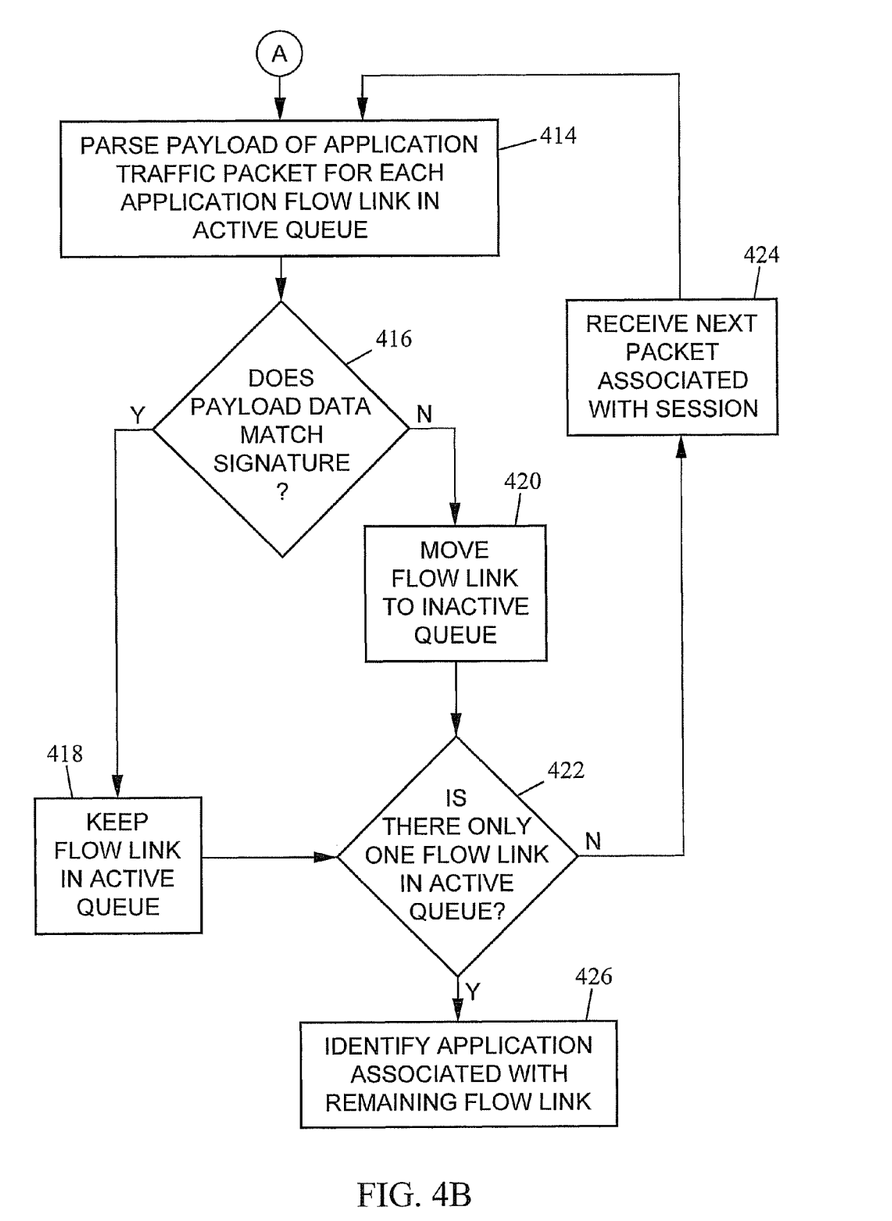

FIGS. 4A and 4B are a flow chart illustrating exemplary steps a method for classifying an application request message received at a network traffic emulation device that emulates multiple application servers according to an embodiment of the subject matter described herein. Referring to FIG. 4A, in step 402 a listening context for each listening port on the network emulator device is created.

In step 404, a plurality of application flows are distributed among the listening contexts. In one embodiment, the listening contexts may each contain one or more of the same application flows. Notably, a listening context may contain any number of application flows that a network operator desires to use to monitor a given transport layer port.

In step 406, application traffic belonging to a new session is received on a listening port. In one embodiment, packets associated with an application request message are received on a transport layer port.

In step 408, a session object is created for the listening port. In one embodiment, a multiflow algorithm (MFA) module may be configured to create a session object for a listening port (e.g., a transport layer port). In one embodiment, the session object may include an Active queue, an In Progress queue, a No Match queue, and an Inactive queue.

In step 410, application flow links are placed in the active queue of the session object. In one embodiment, the MFA module places the flow links corresponding to the listening port's application flows in the Active queue of the session object.

In step 412, a flow-established algorithm is initiated for each application flow link in the Active queue. In one embodiment, the MFA module executes the flow-established algorithm for each application flow corresponding to the application flow links maintained in the Active queue.

Referring to FIG. 4B, in step 414, the payload of the application traffic packet is parsed for each application flow link in the Active queue. In one embodiment, the payload data of a received application request message is parsed using each of the application flows in the listening context. Notably, the parsing of data occurs in the Active queue.

In step 416, a determination is made as to whether the payload data matches a signature of an application flow. In one embodiment, at least a portion of the payload data contained in the received application traffic is compared to the application flow signature. If a match is found, method 400 continues to block 418 where the application flow link is kept in the Active queue of the session object (i.e., matching flow link remains in Active queue as a remaining application flow link). If a match is not found, method 400 instead proceeds to step 420 where the application flow link is moved to the Inactive queue in the session object (i.e., non-matching application flow link is eliminated from Active queue).

In step 422, a determination is made as to whether there is only one application flow link remaining in the Active queue. If there is a plurality of flow links in the Active queue, then method 400 continues to step 424, where a subsequent packet associated with the session is received. Method 400 then loops back to step 414 to process the subsequent session packet. If it is determined that only one flow link remains in the Active queue, then method 400 continues to step 426 where an application associated with the remaining flow link is identified. At this stage, the emulated server may be configured issue a response message associated with the identified application. Although FIGS. 4A and 4B only describe the use of the Active queue and Inactive queue, it may be understood that the present subject matter may also utilize all of the queues disclosed in FIG. 3 above.

The present subject matter may also include a general parsing engine (GPE) 116 that may be used to perform the parsing tasks indicated above (e.g., step 414 in FIG. 4B). GPE 116 may include a software based module that when executed by CPU 106 may applies a set of rules on incoming messages to determine i) whether to extract any information from one or more parts of the message, ii) ignore some parts of the message, and iii) when to finish parsing the data and know that the message has ended. GPE 116 may receive input in the form of Receive Rules and Parse Rules as described in below. In one embodiment, GPE 116 utilizes a general parsing algorithm that applies a plurality of parsing rules in parallel to incoming application traffic data in order to determine when a given parse rule matches a message's payload, for example.

In one embodiment, the parse rules processed by GPE 116 include an entity that parses a portion of an incoming message. A Parse Rule may include either a Bytes Parse Rule or Token Parse Rule. Each parse rule uses a different mechanism to identify what part of the message the parse rule will process/consume. Similarly, GPE 116 may process a Receive Rule, which includes a collection of Parse Rules. Each Receive Rule can parse a portion of a message or parse the message completely. If there are multiple Receive Rules defined, each one executes in sequence. Namely, a first Receive Rule may start parsing the bytes of a message at the point/position where the previous Receive Rule ended. Each Receive Rule completes its parsing task before the next one is applied.

As indicated above, one type of Parse Rule includes a Token Parse Rule. Many text based protocols, such as HTTP, SMTP and applications based on HTTP, rely on predefined tokens for delimiting the information carried in packets. For example, an HTTP packet can have header lines that start with "Set-Cookie" and end with CR-LF ("\r\n"). Similarly, the packet may have header lines that start with "Content-Type" and end with a CR-LF that conveys certain information to the recipient. Such protocols do not define the number of bytes contained within the tokens or where in the packet these tokens can appear. Generally, a Token Parse Rule will have two delimiters. A first delimiter for the start of the data and a second delimiter for the end of the data the parse rule is interested in.

In one embodiment, a Token Parse Rule may be configured to search an incoming stream of bytes for the first or starting delimiter and to operate/process (e.g., store or discard) the bytes starting from the first byte after the end of the starting delimiter until the ending delimiter is seen. The bytes may be stored if there are variable references in the parse rule. The bytes may be discarded if there are no variable references in the parse rule. The Token Parse Rule may then stop and complete operation when the ending delimiter is received and/or detected. Token Based Parsing may either include ASCII Token Parsing, where the tokens are characters from the ASCII character set, and Binary Token Parsing, which includes an approach for processing binary protocols.

Token Parse Rules can be used to receive and store bytes between two predefined (e.g., well-known) tokens. Specifically, the parse rule can be used to i) receive and store data which is classified as a "MUST", i.e., data that should always be present in an incoming message and ii) receive and store data which is classified as "OPTIONAL", i.e., store data in the event the token is detected. Token Parse Rules may also be used to receive and discard Bytes until a predefined (e.g., well-known) token is detected. Lastly, a particular Receive Rule is to be finished if a certain Token Parse Rule is seen. When such a Token Parse Rule matches incoming data, the Receive Rule is declared complete.

In one embodiment, Token Parse Rules include a number of attributes that may be used by an algorithm. For example, these attributes may include a StartIndicator, an EndIndicator, NoData indicator, a MustRule indicator, and a Final indicator. The StartIndicator may include a string of characters which mark the start of the data the Token Parse Rule is interested in. Notably, this attribute is optional since a Parse Rule may contain an EndIndicator with no StartIndicator. The EndIndicator includes a string of characters which mark the end of the data the Parse Rule is interested in. The NoData indicator may include a flag that indicates that no bytes should be expected between the start and end indicator. If this indicator is equal to zero (0), it means 0 or more bytes may be obtained for this Parse Rule. If the indicator is equal to one (1), it means the Parse Rule does not expect any bytes between the start and end indicator. A MustRule indicator Indicates whether encountering the tokens of this Parse Rule (e.g., the start and end indicator) is a MUST for the incoming message. If the value is equal to 1, it is a MUST. If the value is equal to 0, it is not a MUST. The Final indicator indicates whether a Parse Rule is the final rule included in an incoming message. This also means that if this Parse Rule is completed, then the particular Receive Rule (i.e., which is a collection of Parse Rules) is complete.

One approach for text based protocols where the tokens are ASCII characters is described below. The approach may also be extended to binary protocols by changing the tokens from ASCII characters to a binary stream of bytes. In one embodiment, the following message is received and is to be parsed.

Incoming Message:
GET /1b.html\r\n
Host: www.ixiacom.com\r\n
Set-Cookie:abcdef\r\n
\r\n In a first example, the parse rule includes a StarIndicator and an EndIndicator. Specifically, the parse rule comprises:
<StartIndicator="Host:" and EndIndicator="\r\n">

After applying the parse rule to the incoming message, this parse rule will parse "www.ixiacom.com".

In a second example, the parse rule only includes an EndIndicator. Specifically, the parse rule comprises:
<StartIndicator=NULL endIndicator="\r\n">

After applying the parse rule to the incoming message, this parse rule will store everything up to "\r\n". Since "\r\n" occurs multiple times in the incoming message, this Parse Rule will parse and extract different content for each "\r\n" it detects. For example, the parse rule will first extract the first line of the incoming message (i.e., the GET line), then the Host line, then the Set-Cookie line, and finally the last line.

In a third example, the parse rule includes a Final Parse Rule. Specifically, the parse rule comprises:
<StartIndicator=NULL endIndicator="\r\n\r\n" final="1">

After applying the parse rule to the incoming message, this parse rule will, upon detecting the sequence "\r\n\r\n, complete the Receive Rule which contains the Parse Rule. In this example, if a Receive Rule had been defined for the header, it will be complete when the header is completely received as the sequence "\r\n\r\n" is detected. If a Parse Rule is marked as Final, the EndIndicator of that parse rule represents the last sequence of bytes of the particular message being parsed.

In a fourth example, the parse rule includes a NoData Parse Rule, which includes two portions. Specifically, the parse rule comprises:

1.   <StartIndicator=NULL   endIndicator="\r\n" noData="1">
2.   <StartIndicator=NULL   endIndicator="\r\n" noData="0">

Notably, the two Parse Rules are identical except for the noData flag. The difference between the two rules is that the first one (with noData="1") will apply only to the last line in the incoming message (i.e., the last "\r\n") as that is the only line where "\r\n" is received with no data bytes from the last parse point. The previous three "\r\n" of the three lines of the incoming message will include data bytes, such as the "GET" line or the "Host" line when the "\r\n" token is detected. Thus, the NoData flag is useful in cases where similar delimiters are used.

In a fifth example, the parse rule includes a MUST Parse Rule, which includes two portions. Specifically, the parse rule comprises:
<StartIndicator="Host:" and EndIndicator="\r\n" MustRule="1">

The above MUST Parse Rule states that the token "Host:" followed by a "\r\n" is a MUST. If a particular Receive Rule is finished/complete and there are Must Rules that have not found/detected, a violation of the defined rules is declared and the flow is aborted. "MUST" differ from "Non-MUST" rules since the former can be viewed as something which is mandatory to receive in a message while the latter is optional.

In one embodiment, a multiple parse rule algorithm may be executed by GPE 116. In many scenarios, it is desirable to parse multiple parts of an incoming message. Therefore, a Receive Rule may contain more than one Parse Rule. Thus, a multiple parse rule algorithm may be used to apply different parse rules within a receive rule in an efficient manner. For example, the multiple parse rule algorithm may be configured to parse data as it arrives without any double parsing.

One exemplary multiple parse rule algorithm may include a first step (Step 1) of setting a parsing table state (e.g., Set Parse Table State=0 (primary), Parse State=0, Last Offset=0). The next step may involve a primary parsing table match. As used herein, a parse table includes a deterministic finite automaton that is used to process input data by a table lookup to efficiently detect single or multiple patterns/signatures. Providing multiple possible patterns yields a single lookup table that is generated once at beginning of simulation/test. This approach allows conducting a search process (e.g., case-sensitive or case-insensitive, in case of text pattern) without restricting performance when searching for multiple patterns in any order as opposed to searching for a single pattern/signature.

Returning to the multiple parse rule algorithm, a Primary Parse Table may be queried and the Parse State is updated as bytes are received (Step 2). If the Parse State indicates any string matched, the Parse Rule whose string matched in the Primary Parse Table is obtained. If the Parse Rule is a Closed Parse Rule, the algorithm proceeds to Step 4. If the Parse Rule is a Half-Closed Parse Rule, the algorithm proceeds directly to Step 6.

At Step 4, the Parse State is set to 0 and the Parse Table state is set to 1 (secondary). The Secondary Parse Table is then queried to lookup the subsequent bytes to locate the end of the End Indicator. At Step 5, the algorithm waits until the secondary Parse Table returns a match and the end Indicator of a Parse Rule is received.

At Step 6, the Parse Rule is queried to check if it is a MUST rule. If the Parse Rule is a MUST rule, the number of MUST rules executed is incremented. At Step 7, the Data_Len is computed as the number of bytes from last offset to now (e.g., Data_Len=current offset—last offset—length (end indicator)).

At Step 8, a determination is made as to whether the parse rule is final or not. If the parse rule is not final, then the algorithm returns to Step 1. Otherwise, the algorithm proceeds to Step 9 where a determination if noData=1 and Data_Len=0 or if noData=0 and Data_Len>=0. If either of these conditions are true, then the correct Final Rule is received and the algorithm proceeds to Step 10. In all other cases, the algorithm returns to Step 1.

At Step 10, the number of MUST rules executed is compared to the number of MUST rules configured in the Receive Rule. If there is a match, the Receive Rule is determined to have completed successfully. Otherwise, the Receive Rule was completed with error.

Notably, by utilizing the above algorithm, incoming data is parsed exactly once, thereby avoiding double parsing. The algorithm also affords a fast run time execution and is efficient there is no memory overhead caused by additional buffering. Moreover, any additional information in the packet is properly handled if the required number of Must Rules is obtained and the right Final Rule is obtained. Also, the order of data in incoming packets may differ since all indicators are examined in parallel.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for classifying application traffic at a network traffic emulation device that emulates multiple application servers, the method comprising:
    at a network traffic emulation device in a traffic simulation system:
        providing a plurality of different application flows for monitoring mixed application traffic received from different emulated client applications in the traffic simulation system via a device under test on the same transport layer port, wherein the network traffic emulation device emulates a plurality of application servers including the different application flows, wherein each of the different application flows is configured to identify packet traffic associated with a particular application that is received from one of the different emulated client applications via the device under test;
        for each of the different application flows that monitor the same transport layer port, parsing a payload of received packets associated with the same session in the mixed application traffic and identifying non-matching application flows based on whether a portion of each payload matches a signature associated with the application flow; and
        eliminating, as identification candidates, non-matching application flows from the application flows that monitor packets received on the same transport layer port until a single application flow that identifies an application for the received packets associated with the same session remains, wherein eliminating the non-matching application flows from the plurality of application flows includes comparing payload data contained in a first session packet of the mixed application traffic with application flow signatures associated with the application flows, eliminating one or more non-matching application flows from the application flows if at least a portion of the payload data does not match the application flow signatures associated with the one or more non-matching application flows, and subsequently comparing payload data contained in a subsequent session packet of the mixed application traffic with application flow signatures associated with the remaining application flows to eliminate non-matching application flows until the single application flow remains.

2. The method of claim 1 wherein the signature includes a predefined data sequence or pattern.

3. The method of claim 1 wherein the remaining application flow is configured to send packets to a client associated with the identified application to emulate at least a portion of an application protocol expected by the client.

4. The method of claim 1 wherein the device under test includes at least one of: a network address translator (NAT), a firewall, an intrusion detection system (IDS), an intrusion protection system (IPS), a deep packet inspection (DPI) device, a wide area network (WAN) optimization device, a layer 7 accelerator, and a server load balancer (SLB).

5. The method of claim 1 wherein the transport layer port is associated with a listening context includes the plurality of different application flows.

6. The method of claim 5 wherein the listening context generates a session object upon a new session message being received at the transport layer port.

7. The method of claim 6 wherein the session object includes at least an active queue and an inactive queue for managing a plurality of application flow links that respectively identify the plurality of different application flows.

8. The method of claim 7 wherein eliminating the non-matching application flows from the plurality of application flows includes transferring the application flow links from an active queue to an inactive queue in the session object.

9. The method of claim 1 wherein parsing the payload of each received packet includes parsing the payload of each received packet using a token parse rule that specifies at least a portion of the signature for the application flow.

10. The method of claim 9 wherein the token parse rule specifies a start indicator and an end indicator and content associated with the signature between the start indicator and the end indicator.

11. The method of claim 9 wherein using the token parse rule includes storing byte data positioned between two predefined tokens in the payload.

12. The method of claim 9 wherein using the token parse rule includes discarding byte data until a predefined token is detected in the payload.

13. The method of claim 9 wherein using the token parse rule includes storing all data until a predefined token is detected in the payload.

14. The method of claim 9 wherein parsing the payload of each received packet includes utilizing a multiple parse rule algorithm to parse the payload of each received packet in a manner that applies multiple token parse rules in parallel.

15. The method of claim 14 comprising utilizing the multiple parse rule algorithm to parse the payload of each received packet in a manner that avoids double parsing of the payload of each received packet.

16. A system for classifying application traffic at a network traffic emulation device that emulates multiple application servers, the system comprising:
- a network traffic emulator, the network traffic emulator including:
  - a plurality of transport layer ports for receiving mixed application traffic generated by different emulated client applications and transmitted to the network traffic emulator via a device under test; and
  - a plurality of different application flows configured to monitor the mixed application traffic received from the different emulated client applications via the device under test on the same transport layer port, wherein the network traffic emulation device emulates a plurality of application servers including the different application flows, wherein each of the different application flows is configured to identify packet traffic associated with a particular application that is received from one of the different emulated client applications via the device under test, for each of the plurality of different application flows that monitor with the same transport layer port, to parse a payload of received packets associated with the same session in the mixed application traffic and to identify non-matching application flows based on whether a portion of each payload matches a signature associated with the application flow, and to eliminate, as identification candidates, non-matching application flows from the application flows that monitor packets received on the same transport layer port until a single application flow that identifies an application for the received packets associated with the same session remains;
  - wherein network traffic emulator is further configured to compare payload data contained in a first session packet of the mixed application traffic with application flow signatures associated with the application flows, eliminate one or more non-matching application flows from the application flows if at least a portion of the payload data does not match the application flow signatures associated with the one or more non-matching application flows, and subsequently compare payload data contained in a subsequent session packet of the mixed application traffic with application flow signatures associated with the remaining application flows to eliminate non-matching application flows until the single application flow remains.

17. The system of claim 16 wherein the signature includes a predefined data sequence or pattern.

18. The system of claim 16 wherein the remaining application flow is configured to send packets to a client associated with the identified application to emulate at least a portion of an application protocol expected by the client.

19. The system of claim 16 wherein the device under test includes at least one of: a network address translator (NAT), a firewall, an intrusion detection system (IDS), an intrusion protection system (IPS), a deep packet inspection (DPI) device, a wide area network (WAN) optimization device, a layer 7 accelerator, and a server load balancer (SLB).

20. The system of claim 16 wherein the transport layer port is associated with a listening context that includes the plurality of different application flows.

21. The system of claim 20 wherein the listening context generates a session object upon a new session message being received at the transport layer port.

22. The system of claim 21 wherein the session object includes at least an active queue and an inactive queue for managing a plurality of application flow links that respectively identify the plurality of different application flows.

23. The system of claim 22 wherein the plurality of different application flows are further configured to transfer the application flow links from an active queue to an inactive queue in the session object.

24. The system of claim 16 wherein the plurality of different application flows are further configured to parse the payload of each received packet using a token parse rule that specifies at least a portion of the signature for the application flow.

25. The system of claim 24 wherein the token parse rule specifies a start indicator and an end indicator and content associated with the signature between the start indicator and the end indicator.

26. The system of claim 24 wherein the plurality of different application flows are further configured to use the token parse rule to store byte data positioned between two predefined tokens in the payload.

27. The system of claim 24 wherein the plurality of different application flows are further configured to use the token parse rule to discard byte data until a predefined token is detected in the payload.

28. The system of claim 24 wherein the plurality of different application flows are further configured to use the token parse rule to store all data until a predefined token is detected in the payload.

29. The system of claim 24 wherein the plurality of different application flows are further configured to utilize a multiple parse rule algorithm to parse the payload of each received packet in a manner that applies multiple token parse rules in parallel.

30. The system of claim 29 wherein the plurality of different application flows are further configured to parse the payload of each received packet in a manner that avoids double parsing of the payload of each received packet.

31. A non-transitory computer readable medium having stored thereon executable instructions that when executed by the processor of a computer control the computer to perform steps comprising:
- at a network traffic emulation device in a traffic simulation system:
  - providing a plurality of different application flows for monitoring mixed application traffic received from different emulated client applications via a device under test on the same transport layer port, wherein the network traffic emulation device emulates a plurality of application servers including the different application flows, wherein each of the different application flows is configured to identify packet traffic associated with a particular application that is received from one of the different emulated client applications via the device under test;
  - for each of the different application flows that monitor the same transport layer port, parsing a payload of received packets associated with the same session in the mixed application traffic and identifying non-matching application flows based on whether a portion of each payload matches a signature associated with the application flow; and
  - eliminating, as identification candidates, non-matching application flows from the application flows that monitor packets received on the same transport layer port until a single application flow that identifies an application for the received packets associated with the same session remains, wherein eliminating the non-matching application flows from the plurality of application flows includes comparing payload data contained in a first session packet of the mixed application traffic with application flow signatures associated with the application flows, eliminating one or more non-matching application flows from the application flows if at least a portion of the payload data does not match the application flow signatures associated with the one or more non-matching application flows, and subsequently comparing payload data contained in a subsequent session packet of the mixed application traffic with application flow signatures associated with the remaining application flows to eliminate non-matching application flows until the single application flow remains.

* * * * *